(12) United States Patent
Schwartz et al.

(10) Patent No.: US 6,473,960 B1
(45) Date of Patent: Nov. 5, 2002

(54) METHOD OF MAKING NITRIDED ACTIVE ELEMENTS

(75) Inventors: Bradford C. Schwartz, Longmont; Steven C. Herrera, Littleton, both of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/479,532

(22) Filed: Jan. 7, 2000

(51) Int. Cl.$^7$ .......................... G11B 5/127; H04R 31/00
(52) U.S. Cl. ................... 29/603.14; 29/603.01; 29/603.13; 29/603.15; 205/119; 205/170; 360/103; 360/113; 360/126
(58) Field of Search ................ 29/603.01, 603.13, 29/603.14, 603.15; 205/119, 170; 360/99.08, 113, 126, 103

(56) References Cited

U.S. PATENT DOCUMENTS

| | | | | |
|---|---|---|---|---|
| 4,402,801 A | * | 9/1983 | Omata | 204/15 |
| 4,881,144 A | * | 11/1989 | Yuito | 360/125 |
| 5,157,570 A | * | 10/1992 | Shukovsky | 360/126 |
| 5,264,981 A | * | 11/1993 | Campbell et al. | 360/126 |
| 5,313,356 A | * | 5/1994 | Ohkubo | 360/126 |
| 5,452,164 A | * | 9/1995 | Cole | 360/113 |
| 5,546,650 A | | 8/1996 | Dee | |
| 5,589,221 A | * | 12/1996 | Hiramoto | 427/430 |
| 5,594,608 A | | 1/1997 | Dee | |
| 5,605,733 A | * | 2/1997 | Ishikawa et al. | 428/65.3 |
| 5,701,221 A | * | 12/1997 | Taniyama | 360/113 |
| 5,710,683 A | | 1/1998 | Sundaram | |
| 5,850,325 A | | 12/1998 | Miyauchi et al. | |
| 5,871,885 A | * | 2/1999 | Roh | 430/313 |
| 5,872,693 A | * | 2/1999 | Yoda | 360/126 |
| 5,878,481 A | * | 3/1999 | Feng | 29/603.13 |
| 5,923,506 A | | 7/1999 | Herrera | |
| 5,932,082 A | * | 8/1999 | Harris | 205/259 |
| 5,935,403 A | * | 8/1999 | Suzuki | 205/209 |
| 5,963,400 A | | 10/1999 | Cates et al. | |
| 5,985,747 A | * | 11/1999 | Taguchi | 438/622 |
| 5,995,343 A | * | 11/1999 | Imamura | 360/126 |
| 5,996,213 A | * | 12/1999 | Shen | 29/603.15 |
| 6,034,847 A | * | 3/2000 | Komuro | 360/126 |
| 6,110,751 A | * | 8/2000 | Sato | 438/3 |
| 6,118,628 A | * | 9/2000 | Sano | 360/126 |
| 6,141,857 A | * | 11/2000 | Furusawa | 29/603 |
| 6,153,063 A | * | 11/2000 | Yamada | 204/192.22 |
| 6,239,948 B1 | * | 5/2001 | Wu et al. | 360/120 |
| 6,262,867 B1 | * | 7/2001 | Sano | 360/126 |

FOREIGN PATENT DOCUMENTS

| | | |
|---|---|---|
| EP | 585 930 | 3/1994 |
| JP | 57053816 | 3/1982 |
| JP | 57 053816 | 3/1982 |
| JP | 3150709 | 6/1991 |
| JP | 03 150709 | 6/1991 |
| JP | 5006834 | 1/1993 |
| JP | 05 006834 | 1/1993 |

* cited by examiner

Primary Examiner—Peter Vo
Assistant Examiner—Paul D Kim
(74) Attorney, Agent, or Firm—Brooks & Kushman P.C.

(57) ABSTRACT

A method of manufacturing an active element for use with a magnetic head includes depositing a magnetic material to form a magnetic member, and nitriding the magnetic member after the depositing step. Preferably, the depositing step comprises depositing nickel-iron alloy, and the nitriding step comprises plasma nitriding the magnetic member. Advantageously, plasma nitriding may be performed at a temperature below 300 degrees Celsius to avoid adverse effects to components of the active element, such as organic planars. Active elements manufactured according to the method of the invention are also disclosed.

9 Claims, 2 Drawing Sheets

METHOD OF MAKING NITRIDED ACTIVE ELEMENTS

TECHNICAL FIELD

The invention relates to active elements for use with magnetic heads and a method of manufacturing the elements, wherein the elements include nitrided magnetic members.

BACKGROUND ART

An important and continuing goal in the data storage industry is that of increasing the density of data stored on a medium. For tape storage systems, this goal has lead to decreasing track width in magnetic tapes, and increasing track density in magnetic tape heads. Similarly, for disk storage systems, this goal has lead to decreasing track width in magnetic disks, and increasing track density in magnetic disk heads. As track density in tape and disk heads increases, so does the need for precise processing and critical dimension control of recording elements and/or read elements disposed in the tape and disk heads.

Prior recording elements include magnetic poles that comprise nickel-iron alloys, such as permalloy, and are made using electroplating manufacturing methods. While electroplating provides good dimensional control, the resultant poles suffer from at least two problems. First, such poles have low resistivity values, and, thus, are not well suited for high frequency applications. Second, the poles are relatively soft, which results in increased pole tip recession.

More recently, poles have been made of alloys, such as cobalt-zirconium-tantalum, sputtered iron-nitride and sputtered nickel-iron-nitride, that are subjected to subtractive processing methods, such as wet chemical etching and electrochemical etching. These alloys, however, demonstrate different etching characteristics depending upon the material of underlying layers. Consequently, it is difficult to achieve precise dimensional control.

Prior read elements include a read structure sandwiched between top and bottom shields. The shields are made of a magnetic material such as ferrite, and the top shield is typically glued to the top of the read structure. With such a construction, it is difficult to achieve precise dimensional control.

Other prior read elements include shields made of nickel-iron alloys. While nickel-iron alloys provide good shielding properties, these materials wear excessively and, therefore, limit head life.

DISCLOSURE OF INVENTION

The invention overcomes the shortcomings of the prior art by providing improved active elements for use with magnetic heads and a method of manufacturing the active elements, wherein the active elements are hardened to increase wear resistance and/or resistivity.

Under the invention, a method of manufacturing an active element for use with a magnetic tape head includes depositing a magnetic material to form a magnetic member, and nitriding the magnetic member after the depositing step.

Preferably, depositing a magnetic material comprises depositing nickel-iron alloy. Furthermore, nitriding the magnetic member preferably includes plasma nitriding the magnetic member. Advantageously, plasma nitriding the magnetic member may be performed at a temperature below 300 degrees Celsius to avoid adverse effects on organic components of the active element.

Further under the invention, a method of manufacturing a recording element for use with a magnetic head includes depositing a seed layer proximate a substrate; electrodepositing a magnetic and electrically conductive material on the seed layer; and nitriding the material after the material has been deposited to increase at least one of hardness and resistivity.

More specifically, a method of manufacturing a magnetic head includes depositing a first seed layer proximate a substrate; electroplating a first layer of nickel-iron alloy on the first seed layer to form a first magnetic pole; plasma nitriding the first magnetic pole; depositing a gap material on the first magnetic pole; depositing a second seed layer on the gap material; electroplating a second layer of nickel-iron alloy on the second seed layer to form a second magnetic pole; and plasma nitriding the second magnetic pole.

According to a feature of the invention, plasma nitriding the first magnetic pole and plasma nitriding the second magnetic pole may be performed simultaneously. Alternatively, each pole may be plasma nitrided separately.

A method of manufacturing a read element according to the invention includes depositing a first seed layer proximate a substrate; electro-depositing a first layer of magnetic material on the first seed layer to form a first shield; nitriding the first shield; depositing a read structure on the first shield; depositing a second seed layer on the read structure; electro-depositing a second layer of magnetic material on the second seed layer to form a second shield; and nitriding the second shield.

Further under the invention, an active element for use with a magnetic head includes an electro-deposited magnetic member that is nitrided after electro-deposition to achieve at least one of a desired hardness and a desired resistivity. Preferably, the magnetic member comprises nickel-iron alloy.

These and other objects, features and advantages of the invention are readily apparent from the following detailed description of the best modes for carrying out the invention when taken in conjunction with the accompanying drawings.

BEST MODES FOR CARRYING OUT THE INVENTION

Figure 1:
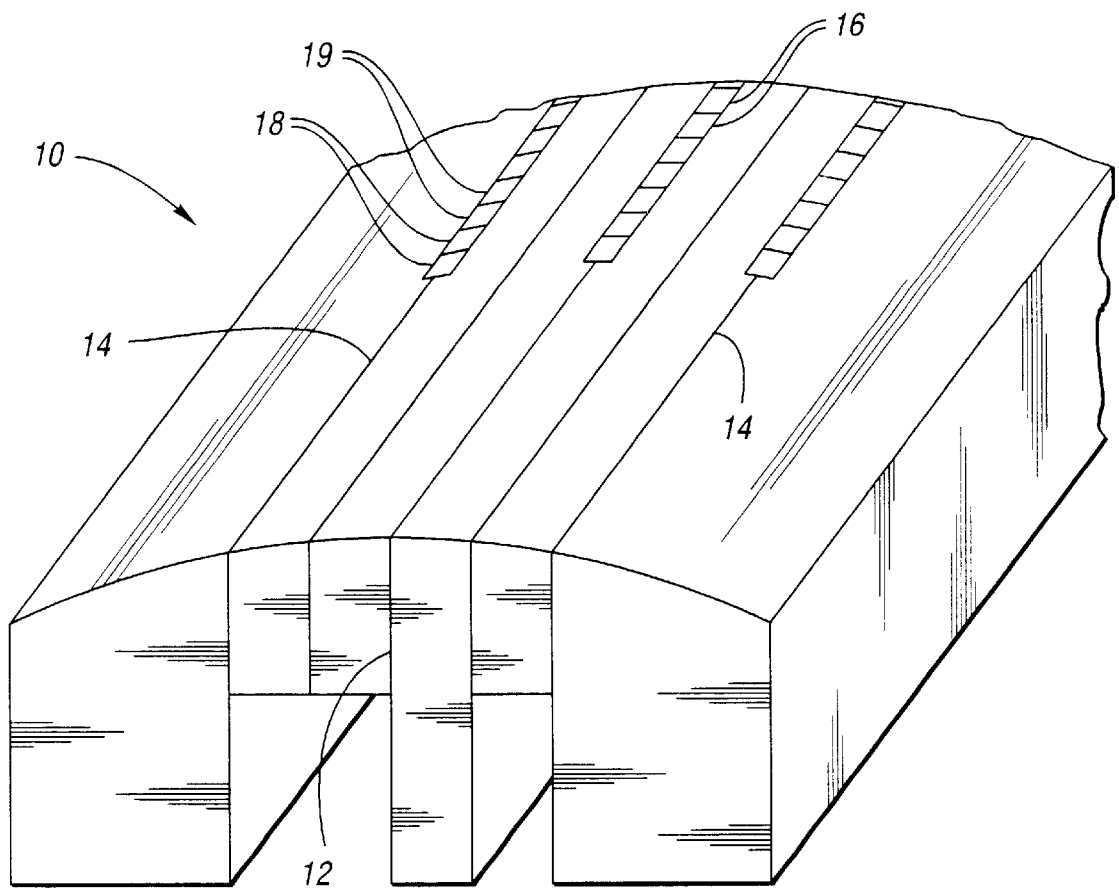
FIG. 1 is a fragmentary perspective view of a magnetic tape head according to the invention having a plurality of magnetic gaps, and a plurality of active elements, such as recording elements and read elements, disposed in the magnetic gaps.

FIG. 1 shows a magnetic tape head 10 according to the invention having a plurality of magnetic gaps, such as a write gap 12 and read gaps 14. The write gap 12 has a plurality of active elements, such as write or recording elements 16, disposed therein. Each of the read gaps 14 also has a plurality of active elements, such as servo elements 18 and read elements 19, disposed therein.

Figure 2:
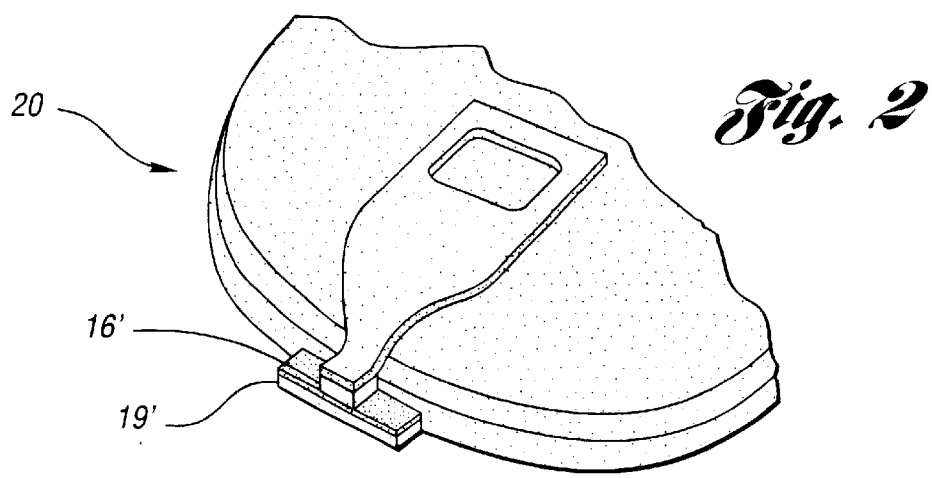
FIG. 2 is a fragmentary perspective view of a magnetic disk head according to the invention having a recording element and a read element.

FIG. 2 shows a magnetic disk head 20 according to the invention. The disk head includes a write element 16', which is similar to the write element 16, and a read element 19', which is similar to the read element 19. As used herein, the term magnetic head may refer to either or both of the tape head 10 and the disk head 20.

Figure 3:
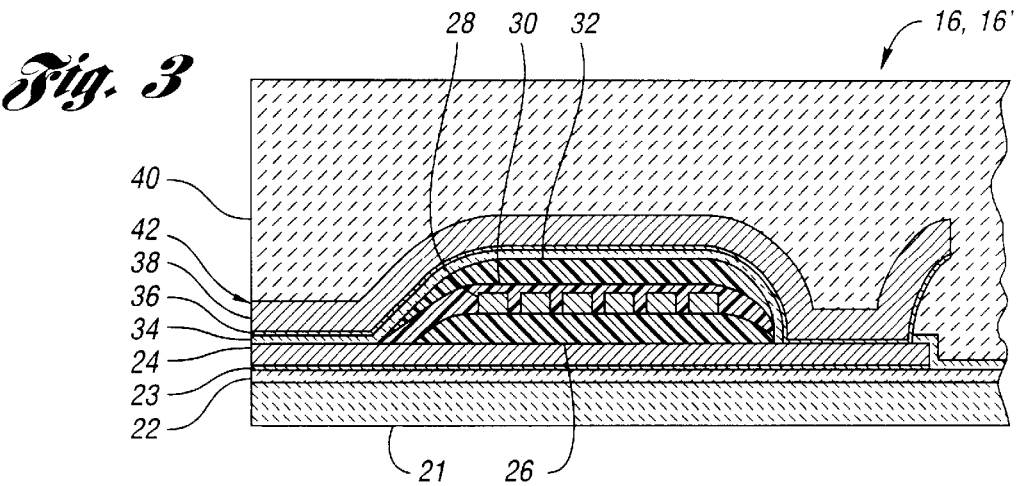
FIG. 3 is a cross-sectional view of an exemplary recording element, which is representative of the recording elements shown in both FIGS. 1 and 2.

With reference to FIG. 3, a method of manufacturing recording elements 16 and 16' will now be described. As shown in FIG. 3, each recording element 16 and 16' includes a substrate 21 made of any suitable material, such as aluminum oxide titanium carbide, ferrite, aluminum oxide, or silicone carbide, and an insulative layer 22 deposited thereon. The insulative layer 22 may be made of any suitable material such as aluminum oxide or alumina. Alternatively, the insulative layer 22 may be eliminated if not required for a particular application. For example, if the substrate layer 21 is made of an insulative material, the insulative layer 22 may not be necessary.

Next, a first seed layer 23 is deposited on the insulative layer 22. The first seed layer 23 may comprise any suitable conductive material such as nickel-iron alloy, and preferably has a thickness in the range of 0.1 to 0.3 microns. A magnetic and electrically conductive material is then deposited on the first seed layer 23 to form a first magnetic member or pole 24 having a thickness preferably, but not necessarily, in the range of 0.5 to 5.0 microns. The first pole 24 is preferably formed by electro-depositing, such as electroplating, the magnetic and electrically conductive material onto the first seed layer 23 using known masking techniques to achieve a desired shape. Because the magnetic and electrically conductive material is preferably bonded to the first seed layer 23, the first seed layer 23 may also be considered part of the first pole 24. While the first pole 24 may comprise any suitable material, the first pole 24 preferably comprises nickel-iron alloy. Furthermore, the first pole 24 is subjected to a post-deposition nitriding process, as explained below in greater detail, to achieve a desired hardness.

A first planar 26, which comprises a photoresist material, is then deposited on the first pole 24. The first planar 26 is processed, such as with spinning techniques, and baked to form a hard, smooth and electrically-insulating surface. A conductive material such as copper is then electroplated or otherwise deposited on first planar 26 to form inductive coils 28. If the coils 28 are formed by electroplating, the coils 28 may also include a seed layer (not shown) of any suitable material that is deposited on the first planar 26 prior to the electroplating process. For example, the seed layer may include one layer of chrome, which acts as an adhesion layer, and one layer of copper deposited on the layer of chrome. Second and third planars 30 and 32, respectively, are then deposited over the coils 28 to create a generally smooth topography. The second and third planars 30 and 32 also comprise a photoresist material that is processed to create openings or vias to first pole 24.

Next, a gap material such as alumina is deposited on the first pole 24 and the third planar 32 to form a magnetic gap 34. A second seed layer 36 of conductive material is then deposited on the magnetic gap 34. The second seed layer 36 preferably, but not necessarily, has a thickness in the range of 0.1 to 0.3 microns. Next, a magnetic and electrically conductive material is deposited on the second seed layer 36 to form a second magnetic member or pole 38 having a thickness preferably, but not necessarily, in the range of 0.5 to 5.0 microns. Similar to the first pole 24, the second pole 38 is preferably formed by electro-depositing the magnetic and electrically conductive material onto the second seed layer 36 using known masking techniques to achieve a desired shape. Because the magnetic and electrically conductive material is preferably bonded to the second seed layer 36, the second seed layer 36 may also be considered part of the second pole 38. While the second pole 38 may comprise any suitable material, the second pole 38 preferably comprises nickel-iron alloy. Furthermore, the second pole 38 is subjected to a post-deposition nitriding process, as explained below in greater detail, to achieve a desired hardness.

Each recording element 16 and 16' may also include an overcoat or closure layer 40, which preferably comprises alumina or other suitable material, deposited on the second pole 38. Furthermore, each recording element 16 and 16' has an air-bearing end surface 42 that is adapted to be positioned adjacent a magnetic tape (not shown) or a magnetic disk (not shown). The end-surface 42 may be prepared using known trimming and/or lapping techniques.

The nitriding process mentioned above is preferably a plasma nitriding process. Such a process involves positioning a partially or fully formed recording element 16 or 16' in a vacuum chamber and between two electrodes, such as an anode and a cathode. Alternatively, the chamber may serve as one electrode, such as the anode, and the recording element 16 or 16' may serve as the other electrode, such as the cathode. The chamber is then filled with a nitrogen gas or nitrogen gas mixture, which may include additional gases such as hydrogen and/or argon. A voltage potential is then applied to the electrodes such that an arc is created between the electrodes. The arc provides the necessary energy to enable nitrogen to diffuse into one or both of the poles 24 and 38, thereby forming nitrided nickel-iron alloy. Preferably, the plasma nitriding process is carried out at temperatures below 300 degrees Celsius so as to avoid adverse effects to the remainder of the recording element 16 or 16', such as the planars 26, 30 and 32.

According to a feature of the invention, the plasma nitriding process may be carried out in two stages, one following deposition of the first pole 24, and the other following deposition of the second pole 38. As a result, each pole 24 and 38 may be nitrided substantially along its entire length. Under this approach, each pole 24 and 38 preferably contains approximately 2 to 8 percent nitrogen. Alternatively, the poles 24 and 38 may be nitrided simultaneously following any trimming and/or lapping of the recording element 16 or 16', such that tips of the poles 24 and 28 are sufficiently hardened. Under this approach, the tip of each pole 24 and 38 preferably contains approximately 2 to 8 percent nitrogen. As yet another alternative, the poles 24 and 38 may be nitrided by any suitable nitriding process. For example, the poles 24 and 38 may be nitrided by heating the poles 24 and 38, and exposing the poles 24 and 38 to nitrogen gas.

Advantageously, as shown in the table below, nitrided nickel-iron alloy (NiFeN) exhibits superior hardness compared with nickel-iron alloy (NiFe) and cobalt-zirconium-tantalum alloy (CoZrTa).

| Material | Hardness (Knoop) | Resistivity (u-ohm-cm) | Ms (saturation magnetization) |
|---|---|---|---|
| NiFe | 671 | 40 | 19,000 |
| NiFeN | 1393 | 64.8 | 17,000 |
| CZT | 995 | 96 | 14,000 |

Consequently, recording elements manufactured according to the method of the invention are more durable than prior recording elements. Furthermore, nitrided nickel-iron alloy exhibits better resistivity than nickel-iron alloy, and better saturation magnetization than cobalt-zirconium-tantalum alloy.

Furthermore, because the poles 24 and 38 are preferably electro-deposited, the method of the invention provides precise dimension control. For example, tolerances of 0.5 microns or less, and wall angles of 80 to 90 degrees may be achieved under the method.

Figure 4:
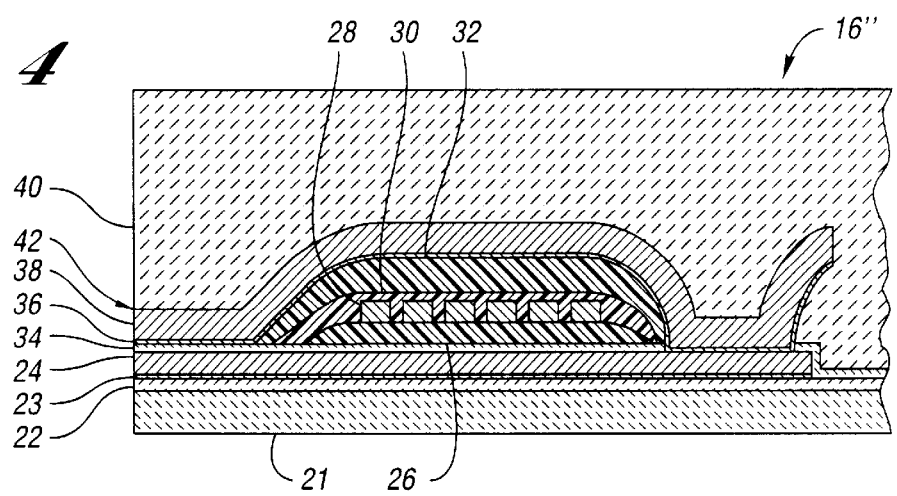
FIG. 4 is a cross-sectional view of an alternative recording element that is representative of an alternative embodiment of the recording elements shown in both FIGS. 1 and 2.

FIG. 4 shows an alternative recording element 16", which is representative of an alternative embodiment of the recording elements shown in both FIGS. 1 and 2. The recording element 16" is similar to the recording elements 16 and 16', and is manufactured in a similar manner. The gap material of the recording element 16", however, is deposited on the first pole 24 to form the magnetic gap 34 prior to depositing the planars 26, 30 and 32 and the coils 28. With such a configuration, the second seed layer 36 is deposited on the magnetic gap 34 and also on the third planar 32.

Figure 5:
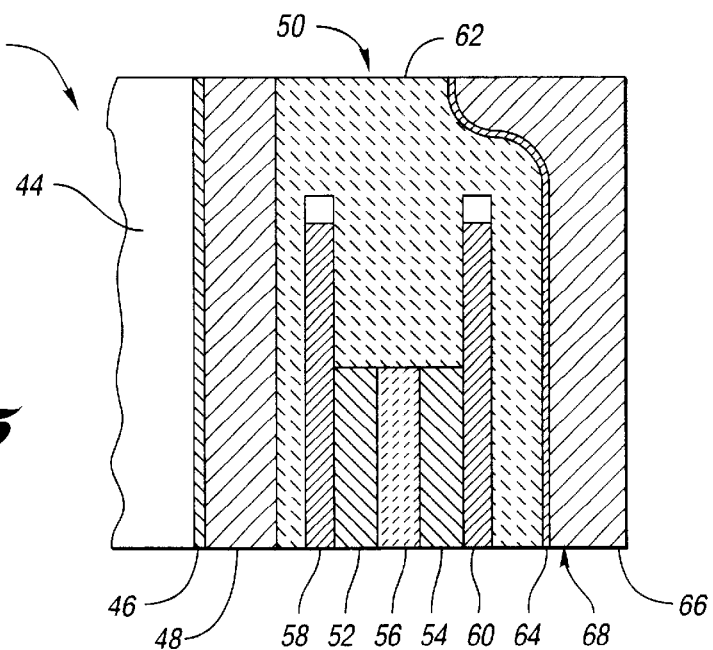
FIG. 5 is a cross-sectional view of an exemplary read element, which is representative of the read elements shown in both FIGS. 1 and 2.

With reference to FIG. 5, a method of manufacturing read elements 19 and 19' will now be described. As shown in FIG. 5, each read element 19 and 19' includes a substrate 44 made of any suitable material, such as aluminum oxide titanium carbide, ferrite, aluminum oxide, or silicone carbide. A first seed layer 46 of conductive material, such as nickel-iron alloy, is deposited on the substrate 44. The first seed layer 46 preferably, but not necessarily, has a thickness in the range of 0.1 to 0.3 microns.

Next, a magnetic material is deposited on the first seed layer 46 to form a first magnetic member or shield 48 having a thickness preferably, but not necessarily, in the range of 2.0 to 3.0 microns. The first shield 48 is preferably formed by electro-depositing, such as electroplating, the magnetic material onto the first seed layer 46 using known masking techniques to achieve a desired shape.

Because the magnetic material is preferably bonded to the first seed layer 46, the first seed layer 46 may also be considered part of the first shield 48. While the first shield 48 may comprise any suitable material, the first shield 48 preferably comprises nickel-iron alloy. Furthermore, the first shield 48 is subjected to a post-deposition nitriding process, similar to the process described above, to achieve a desired hardness and/or resitivity.

A read structure 50 is then deposited on the first shield 48 using known techniques. The read structure 50 may include first and second magneto-resistive elements 52 and 54, respectively, that are separated by an insulating layer 56. The magneto-resistive elements 52 and 54 may comprise any suitable material such as nickel-iron alloy or other metal, and the insulating layer 56 may comprise any suitable material such as alumina. First and second conductors 58 and 60, respectively, are disposed adjacent the first and second magneto-resistive elements 52 and 54, respectively, and are configured to provide current to the magneto-resistive elements 52 and 54. While the conductors 58 and 60 may comprise any suitable material, the conductors 58 and 60 preferably comprise gold. The read structure 50 further includes an insulating material 62, such as alumina, that surrounds the conductors 58 and 60.

Next, a second seed layer 64 of conducive material is deposited on the read structure 50. The second seed layer 64 may comprise any suitable material such as nickel-iron alloy, and preferably, but not necessarily, has a thickness in the range of 0.1 to 0.3 microns. A magnetic material is then deposited on the second seed layer 64 to form a second magnetic member or shield 66 having a thickness preferably, but not necessarily, in the range of 2.0 to 3.0 microns. The second shield 66 is preferably formed by electro-depositing, such as electroplating, the magnetic material onto the second seed layer 64 using known masking techniques to achieve a desired shape. Because the magnetic material is preferably bonded to the second seed layer 64, the second seed layer 64 may also be considered part of the second shield 66. While the second shield 66 may comprise any suitable material, the second shield 66 preferably comprises nickel-iron alloy. Furthermore, the second shield 66 is subjected to a post-deposition nitriding process, similar to the process described above, to achieve a desired hardness.

Each read element 19 and 19' also has an air-bearing end surface 68 that is adapted to be positioned adjacent a magnetic tape (not shown) or a magnetic disk (not shown). The end-surface 68 may be prepared using known trimming and/or lapping techniques.

As with the recording elements 16 and 16', the nitriding process for each of the read elements 19 and 19' is preferably a plasma nitriding process that is performed at a temperature below 300 degrees Celsius. Furthermore, the process may be carried out in two stages, one following deposition of the first shield 48, and the other following deposition of the second shield 66. As a result, each shield 48 and 66 may be nitrided substantially along its entire length. Alternatively, the shields 48 and 66 may be nitrided simultaneously following any trimming and/or lapping of each of the read elements 19 and 19', such that tips of the shields 48 and 66 are sufficiently hardened. As yet another alternative, the shields 48 and 66 may be nitrided by any suitable nitriding process. For example, the shields 48 and 66 may be nitrided by heating the shields 48 and 66, and exposing the shields 48 and 66 to nitrogen gas.

Because the shields 48 and 66 are preferably formed by electro-deposition, read elements 19 and 19' may be more accurately formed than prior read elements having one or more shields that are glued to a read structure. Furthermore, because the shields 48 and 66 are nitrided, read elements 19 and 19' are significantly more wear resistant than prior shielded read elements.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of manufacturing a magnetic head, the method comprising:

depositing a first seed layer proximate a substrate;

electroplating a first layer of nickel-iron alloy on the first seed layer to form a first magnetic pole;

plasma nitriding the first magnetic pole at a temperature below 300 degrees Celsius;

depositing a gap material on the first magnetic pole;

depositing a second seed layer on the gap material;

electroplating a second layer of nickel-iron alloy on the second seed layer to form a second magnetic pole; and plasma nitriding the second magnetic pole at a temperature below 300 degrees Celsius.

2. The method of claim 1 further comprising depositing an insulative layer on the substrate, wherein the step of depositing a first seed layer comprises depositing the first seed layer on the insulative layer.

3. The method of claim 1 wherein the step of plasma nitriding the first magnetic pole and the step of plasma nitriding the second magnetic pole are performed simultaneously.

4. The method of claim 1 further comprising:

depositing a first planar on the first magnetic pole;

depositing a coil on the first planar; and depositing a second planar on the coil;

wherein the step of depositing a gap material on the first magnetic pole includes depositing the gap material on the second planar.

5. The method of claim 4 wherein the step of depositing a second planar comprises depositing at least two planar layers on the coil.

6. The method of claim 1 wherein the step of plasma nitriding the first magnetic pole is performed prior to the step of depositing a gap material on the first magnetic pole.

7. The method of claim 1 wherein the step of plasma nitriding the first magnetic pole is performed such that a tip of the first magnetic pole contains two to eight percent nitrogen, and wherein the step of plasma nitriding the second magnetic pole is performed such that a tip of the second magnetic pole contains two to eight percent nitrogen.

8. The method of claim 1 wherein the first magnetic pole has a first length, the second magnetic pole has a second length, the step of plasma nitriding the first magnetic pole is performed such that the first magnetic pole contains two to eight percent nitrogen substantially along the entire first length of the first magnetic pole, and the step of plasma nitriding the second magnetic pole is performed such that the second magnetic pole contains two to eight percent nitrogen substantially along the entire second length of the second magnetic pole.

9. The method of claim 1 wherein the step of plasma nitriding the first magnetic pole is performed such that the first magnetic pole has a hardness of at least 1,300 Knoop, and the step of plasma nitriding the second magnetic pole is performed such that the second magnetic pole has a hardness of at least 1,300 Knoop.

* * * * *